(12) United States Patent
Weng et al.

(10) Patent No.: US 10,735,501 B2
(45) Date of Patent: Aug. 4, 2020

(54) SYSTEM AND METHOD FOR LIMITING ACCESS REQUEST

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventors: Zhi Weng, Beijing (CN); Sixing Xiao, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 490 days.

(21) Appl. No.: 15/542,086

(22) PCT Filed: Jan. 8, 2016

(86) PCT No.: PCT/CN2016/070522
§ 371 (c)(1),
(2) Date: Jul. 7, 2017

(87) PCT Pub. No.: WO2016/110273
PCT Pub. Date: Jul. 14, 2016

(65) Prior Publication Data
US 2018/0278678 A1   Sep. 27, 2018

(30) Foreign Application Priority Data
Jan. 9, 2015   (CN) .......................... 2015 1 0011598

(51) Int. Cl.
*G06F 15/16* (2006.01)
*H04L 29/08* (2006.01)
*H04L 29/06* (2006.01)

(52) U.S. Cl.
CPC ...... *H04L 67/1002* (2013.01); *H04L 63/0236* (2013.01); *H04L 63/101* (2013.01);
(Continued)

(58) Field of Classification Search
CPC .............. H04L 63/0236; H04L 63/101; H04L 63/1458; H04L 67/1002; H04L 67/1023;
(Continued)

(56) References Cited

U.S. PATENT DOCUMENTS

| 7,463,590 B2 * | 12/2008 | Mualem | H04L 63/1458 370/241 |
| 9,794,272 B2 * | 10/2017 | Strub | H04L 63/1441 |
| 2014/0259147 A1 * | 9/2014 | L'Heureux | H04L 63/02 726/14 |

FOREIGN PATENT DOCUMENTS

| CN | 101437030 A | 5/2009 |
| CN | 103746982 A | 4/2014 |

(Continued)

OTHER PUBLICATIONS

International Search Report with English translation and Written Opinion for Application No. PCT/CN2016/070522 dated Apr. 13, 2016 (11 pages).

*Primary Examiner* — Ryan J Jakovac
(74) *Attorney, Agent, or Firm* — Michael Best & Friedrich LLP (57) ABSTRACT

A system and method for limiting access requests. In one system, a load balancer receives an access request, parses the access request into a UDP message, and transmits the UDP message to an aggregator; the aggregator accumulates the UDP message according to a predefined combination of (Continued)

data fields and a predefined duration so as to produce statistical data, and sends the statistical data to a summarizer in response to a request from the summarizer; the summarizer requests the statistical data from the aggregator according to a predefined request time interval, receives the statistical data from the aggregator, generates a blacklist for the access requests according to the received statistical data and a predefined rule, and sends the blacklist to the load balancer in response to a request from the load balancer. The load balancer determines a processing action on each of the received access requests according to the current blacklist.

6 Claims, 3 Drawing Sheets

(52) U.S. Cl.
CPC ...... *H04L 67/1023* (2013.01); *H04L 67/2814* (2013.01); *H04L 67/2819* (2013.01); *H04L 67/2828* (2013.01); *H04L 67/2833* (2013.01); *H04L 69/164* (2013.01); *H04L 63/1458* (2013.01)

(58) Field of Classification Search
CPC ............. H04L 67/2814; H04L 67/2819; H04L 67/2828; H04L 67/2833; H04L 69/164
See application file for complete search history.

(56) References Cited

FOREIGN PATENT DOCUMENTS

| | | |
|---|---|---|
| CN | 104104669 A | 10/2014 |
| CN | 104579841 A | 4/2015 |
| CN | 104580216 A | 4/2015 |
| CN | 104580228 A | 4/2015 |

* cited by examiner

SYSTEM AND METHOD FOR LIMITING ACCESS REQUEST

CROSS-REFERENCE TO RELATED APPLICATIONS

This application is a national stage filing under 35 U.S.C. 371 of International Application No. PCT/CN2016/070522 filed Jan. 8, 2016, which claims the foreign priority benefit of Chinese Patent Application No. 201510011598.9 filed Jan. 9, 2015, which are incorporated by reference herein in their entireties.

TECHNICAL FIELD

The invention relates to a system for limiting access requests from a network and its corresponding method.

BACKGROUND ART

A legacy load balancer, for example, uses a configuration of HaProxy in linux to read cookies or URL descriptions contained in each HTTP request from a network, and rewrite a header based on these pieces of information and send the HTTP request to a backend server cluster, so that a balanced state of traffic and resource consumption is achieved for each server in the backend server cluster. But the legacy load balancer would not automatically perform a filtering check on traffics from the network, and cannot perform throttling or discarding on traffics considered as cyber attack.

It is known in the prior art that there is a solution for achieving protection against ICMP/TCP/UDP flooding by detecting TCP packets based on flow cleaning technology, which is achieved by retransmitting TCP/UDP packets. But the known solution is only effective for packets from a TCP/UDP layer, and is helpless for preventing HTTP flooding from an application layer required for the decryption, which is the seventh layer in Open System Interconnection (OSI) Reference Model.

One conception is to analyze an access to URL, and limit access requests according to the number of access requests per unit time such as QPS. The analysis on the access to the URL of a large scale website usually consumes a lot of memory. In general, it is required to record a timestamp of each access associated with any combination of data fields such as an IP address, a user identification (USERID) and a uniform resource locator (URL). When it is required to calculate the QPS, respective time points are filtered out or sorted, which consumes time as well as consumes a memory space.

In the prior art, when it is required to calculate the QPS, the respective time points are filtered out or sorted, which consumes the time as well as consumes the memory space.

SUMMARY OF THE INVENTION

The object of the invention is to provide a system and method that at least partially solve the above problem. The invention is particularly suitable for solutions of the problem of DOS attacks (denial of service attacks) and DDOS attacks (distributed denial of service attacks) in a network. This technique is particularly suitable for prevention against HTTP flooding. The invention recognizes attack traffics that follow pattern matching and performs throttling or discarding on the attack traffics by accumulating and analyzing user traffics to thereby protect the backend servers.

According to one aspect of the invention, a system for limiting access requests is provided. The system comprises a load balancer, an aggregator and a summarizer. The load balancer is configured to receive each access request from a network, parse the received access request into a UDP message, and transmit the UDP message to the aggregator; the aggregator is configured to accumulate the plurality of UDP messages received from the load balancer according to a predefined combination of data fields and a predefined duration so as to produce a statistical data, and send the accumulated statistical data to the summarizer in response to a request from the summarizer; the summarizer is configured to request the statistical data from the aggregator according to a predefined request time interval, receive the statistical data from the aggregator, generate a blacklist for access requests according to the received statistical data and a predefined rule, and send the blacklist to the load balancer in response to a request from the load balancer, wherein the blacklist specifies a processing action to be made on each of one or more specific access requests. The load balancer is further configured to determine the processing action on each of the received access requests according to the current blacklist.

According to another aspect of the invention, a computer-implemented method for limiting access requests is provided. The method comprises: a load balancer receiving each access request from a network, parsing the received access request into a UDP message, and transmitting the UDP message to the aggregator; and the load balancer determining a processing action on the received access request according to a current blacklist, wherein the blacklist specifies the processing action to be made on each of one or more specific access requests; the aggregator receiving the UDP message sent by the load balancer, accumulating the received plurality of UDP messages according to a predefined combination of data fields and a predefined duration so as to produce a statistical data, and sending the accumulated statistical data to a summarizer in response to a request from the summarizer; and the summarizer requesting the statistical data from the aggregator according to a predefined request time interval, receiving the statistical data from the aggregator, generating an a blacklist for access requests according to the received statistical data and a predefined rule, and sending the blacklist to the load balancer in response to a request from the load balancer.

According to the invention, the statistical data includes the number of the UDP messages containing the predefined combination of data fields accumulated within the predefined duration.

According to the invention, the network is the Internet, and the access request is an HTTP request from the Internet.

According to the invention, the aggregator comprises a plurality of aggregation units operating independently of each other, the load balancer transmits each UDP message to one of the plurality of aggregation units, and each of the plurality of aggregation units performs the accumulation, respectively. The summarizer receives the statistical data from the plurality of aggregation units, respectively, and produces the summarized statistical data. And the blacklist is generated based on the summarized statistical data and the predefined rule.

According to the invention, the load balancer further comprises a predefined whitelist which includes one or more records relating to the access requests to be passed. And the load balancer determines for each of the received access requests the processing action on the access request as follows: when the access request matches with one of the records in the whitelist or does not match with any one of the records in the blacklist, the access request is passed; and when the access request does not match with any one of the records in the whitelist and matches with one of the records in the blacklist, the access request is processed according to the processing action specified by the matched record in the blacklist. In addition, the predefined whitelist in the load balancer can be obtained from the summarizer along with the blacklist.

In the system according to the invention, the processing action specified in the blacklist includes one of the following: an interception, a redirection and a delay.

BRIEF DESCRIPTION OF THE DRAWINGS

Embodiments of the invention will be described in detail below with reference to the figures, wherein.

DETAILED DESCRIPTION

The invention provides a system and method for limiting access requests from a network using a statistical data.

An access request such as an HTTP request at least includes the following data fields: a destination domain name (host) to be accessed by the user who sends a query; a universal resource identifier (uri) requested by the user; a user identification (uid); a client IP address (cip) and the like According to the invention, the invention provides a system for limiting access requests from a network, the system comprising a load balancer, an aggregator and a summarizer.

The load balancer receives the access request from the network, parses each of the received access requests into a UDP message, and transmits the UDP message to the aggregator.

The aggregator accumulates the received plurality of UDP messages according to a predefined combination of data fields and a predefined duration so as to produce a statistical data, and sends the statistical data to the summarizer in response to a request from the summarizer. The statistical data includes the number of the UDP messages containing the predefined combination of data fields accumulated within the current predefined duration.

The summarizer requests the statistical data relating to the access requests from the aggregator according to a predefined request time interval, receives the statistical data from the aggregator, generates a blacklist for access requests according to the received statistical data and a predefined rule, and sends the blacklist to the load balancer according to a request of the load balancer, wherein the blacklist specifies a processing action on each of one or more specific access requests.

The load balancer determines the processing action on each of the received access requests according to the current blacklist.

The system according to an embodiment of the invention is described in detail below by taking specific embodiments into consideration. But it should be understood that the specific embodiments are only used for understanding the spirit and specific implementation of the invention, but the invention is not limited to the specific embodiments.

Figure 1:
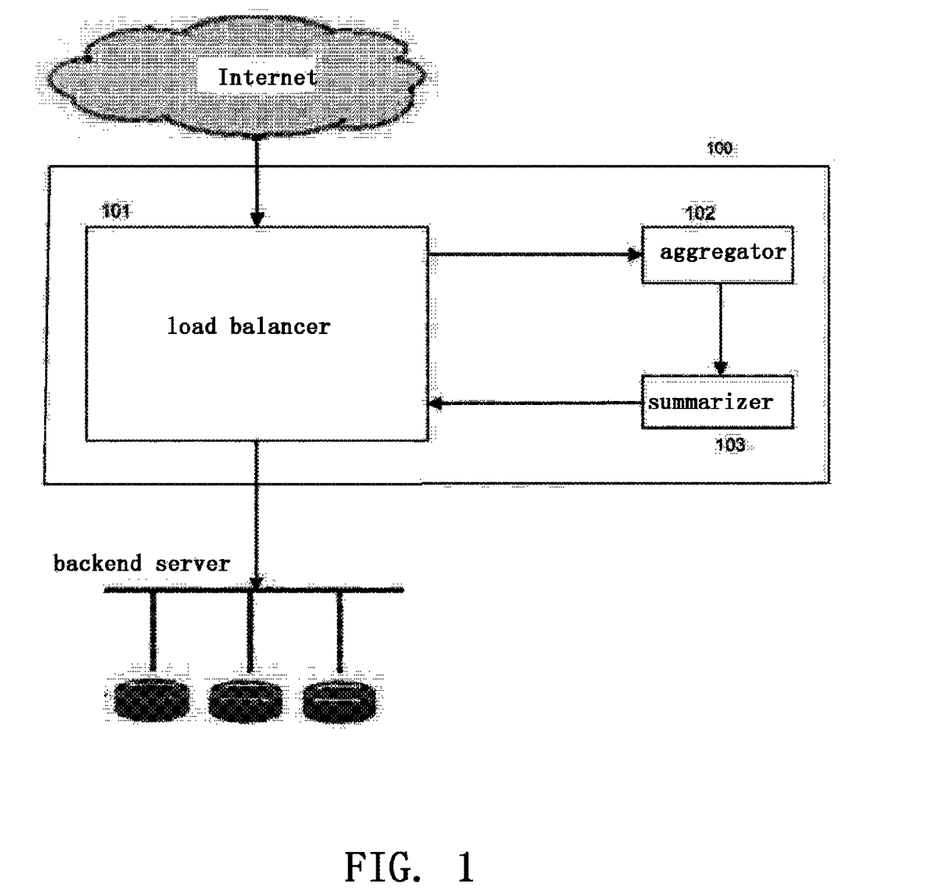
FIG. 1 is a structural diagram of a system for limiting access requests according to the invention.

FIG. 1 shows a system 100 according to an embodiment of the invention, and the system 100 comprises the following three modules:

a load balancer 101, an aggregator 102, and a summarizer 103.

The load balancer 101 receives access requests from a network, e.g., an HTTP request from the Internet, parses each of the received access requests into a UDP message, and transmits the UDP message to the aggregator 102.

Since the processing for the UDP messages consumes less resources, and has a fast processing speed, overhead of the load balancer can be greatly reduced. In addition, a UDP protocol is not a connection-based protocol, so there may be some cases of a message loss. But such loss is within an acceptable error range, and its impact on robustness of the system is negligible.

The aggregator 102 may comprise a plurality of aggregation units. The plurality of aggregation units can be scaled up independently, that is, each of the aggregation units is deployed and operated independently, and correspondingly, the aggregation units do not affect and depend on each other. If the processing capacity of the current aggregator cannot satisfy requirements, it is convenient to add server resources so that new aggregation units are deployed. This can better satisfy requirements for a large traffic flow.

The load balancer 101 transmits each UDP message to at least one selected aggregation unit. And the respective aggregation units accumulate the received UDP messages, respectively, and produce the statistical data.

According to an embodiment of the invention, the load balancer 101 sends the UDP messages to the plurality of aggregation units by turns. For example, the first UDP message is sent to the first aggregation unit, the second UDP message is sent to the second aggregation unit, and the produced UDP messages are sequentially sent to the respective aggregation units. After a UDP message is sent to the last aggregation unit, a new UDP message is sent to the first aggregation unit again.

Each aggregation unit analyzes and accumulates the received UDP messages according to a predefined rule or condition such as a predefined combination of data fields and a predefined time interval. Each UDP message contains information of the HTTP access request from the user such as the destination domain name (host) accessed by the user, the universal resource identifier (uri) requested by the user, the user identification (uid) and the client IP address (cip). The aggregation unit counts the number of the access requests having the same destination domain name (same host) and the same source (same uid, same cip) to thereby obtain the number of the access requests from the source.

The number of the access requests per unit time from the source can be derived according to the number of the received access requests from the source within a defined period (e.g., the last 60 seconds or the last 5 minutes). For example, a value of a query per second (QPS) relating to the source can be obtained by dividing the total number of the received access requests from the source within the defined period by the duration of the period.

Then, the aggregation unit sends the latest statistical data relating to the access requests produced at the aggregation unit to the summarizer 103 according to a request from the summarizer 103.

The aggregator 103 can request the "statistical data" from the aggregator or each of the aggregation units every predefined time, e.g., every 10 seconds, and such request, for example, may be in the form of HTTP.

After each aggregation unit of the aggregator receives the request from the summarizer 103, it constructs the latest statistical data relating to the access produced thereby into a response message such as a response message in the form of HTTP, and sends the response message containing the latest statistical data to the summarizer 103.

The summarizer 103 processes the statistical data contained in the messages according to a specific classification after receiving the response messages from the respective aggregation units, so as to produce the summarized statistical data and generate the blacklist according to the predefined rule.

According to an embodiment of the invention, a blacklist record in the blacklist may contain the following four parameters:
destination domain name (host),
source user identification (uid),
source client IP (cip), and
processing action (action).

The records in the blacklist can be understood as follows: for a request sent to the destination domain name (host), if the user identification and the client IP contained in the request are equivalents to the corresponding values (source user identification, source client IP) in the record, the processing action specified in the record is performed. The processing action may be, for example, an interception, a redirection, or a delay for the request.

When the destination domain name, the user identification and the client IP address contained in an access request are exactly same as the destination domain name, the user identification and the client IP address in a record in the blacklist, the access request is considered to match with the blacklist.

Figure 3:
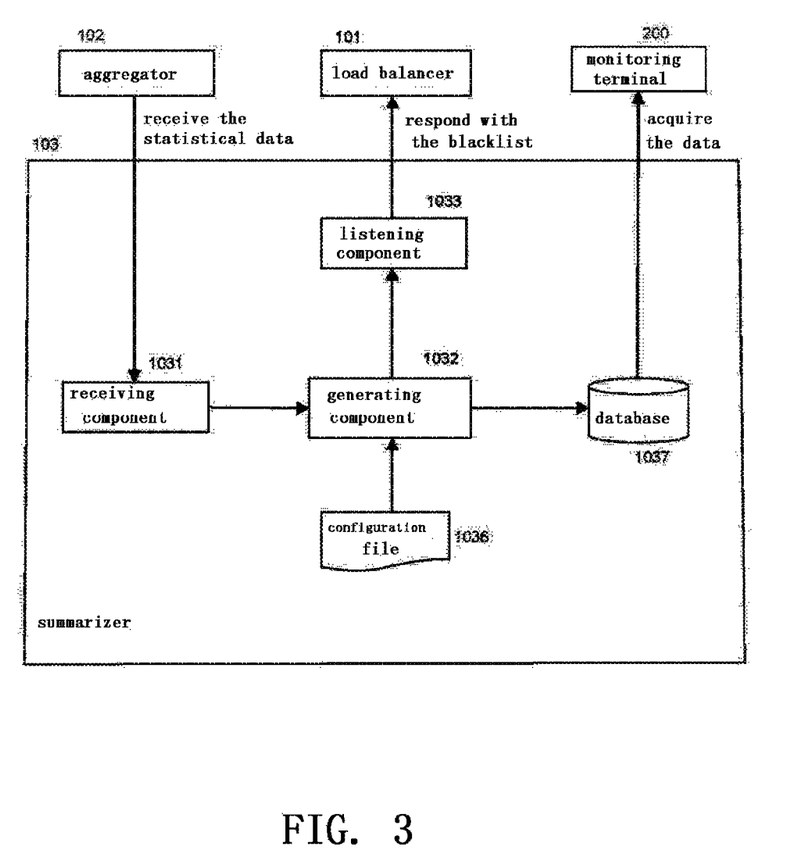
FIG. 3 is a block diagram of an exemplary composition of a summarizer according to the invention.

With respect to the specific destination domain name, a threshold value for the number of the requests per unit time and the corresponding processing action in the case that the threshold value is exceeded are set in a configuration file 1036 of the summarizer 103.

The summarizer 103 makes a judgment according to the summarized statistical data for the access requests having the same combination of data fields, when a value of the number of the access requests per unit time (QPS) for such access requests exceeds the threshold value for the number of the access requests per unit time corresponding to the destination domain name thereof set in the configuration file 1036, a corresponding blacklist record is produced, and the record includes the destination domain name, the user identification, and the client IP of the request, as well as the corresponding processing action. The produced blacklist record is added to the blacklist to thereby produce the current blacklist.

In addition, a whitelist may be also maintained in the summarizer 103. The whitelist may have the same structure as the blacklist, but the whitelist can implement a processing policy with priority that directly passes the access request that matches with the whitelist (i.e., in the case that the access request matches with one whitelist record in the whitelist), that is, the access request is guided to its destination backend server (host), and the backend server directly makes a response to the access request.

The summarizer 103 can asynchronously load the current blacklist and the predefined whitelist to the load balancer 101. According to an embodiment of the invention, a listening thread of the summarizer 103 can provide the blacklist to the load balancer 101. When the load balancer 101 initiates a request to the summarizer 103, the listening thread acquires the current blacklist at the summarizer 103, and sends the blacklist to the load balancer 101 along with the whitelist.

The load balancer 101 is an actual executor of the "processing action" specified by each record in the blacklist.

Certainly, the whitelist is not necessarily maintained in the summarizer 103, and can be also maintained, for example, in the load balancer 101.

If an access request matches with the whitelist, since the processing principle of the load balancer 101 is that the whitelist has a higher priority, the load balancer 101 will pass the access request regardless of whether the access request matches with the blacklist. If the access request does not match with the whitelist but matches with the blacklist, the load balancer 101 performs the corresponding processing action according to the specific record matched in the blacklist. If the access request neither matches with the whitelist nor matches with the blacklist, the access request is passed.

According to the invention, the load balancer 101 performs the following processing for each access request from the network according to the blacklist and the whitelist:

when the access request matches with the whitelist or does not match with the blacklist, the access request is passed, and the corresponding UDP message is constructed and sent to the aggregator (because only such passed traffic is indeed directed to the corresponding backend server, the aggregator needs to continue to calculate the "statistical data" of such access requests); and when the access request does not match with the whitelist but matches with the blacklist, the access request is processed according to the processing action specified by the matched record in the blacklist.

Figure 2:
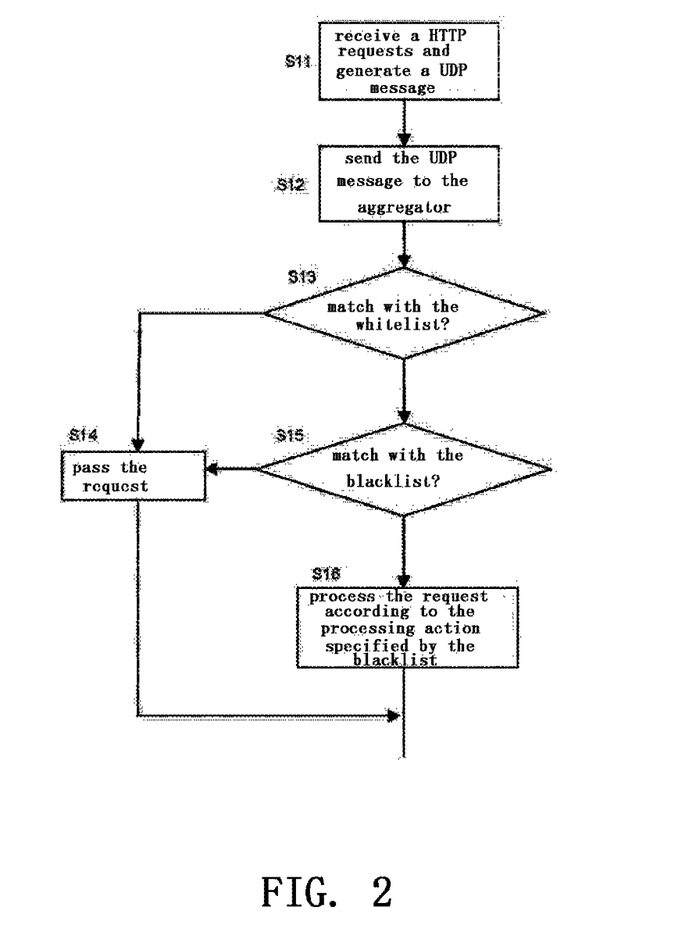
FIG. 2 is a flow diagram of processing the received access requests by a load balancer according to the invention.

FIG. 2 shows a method for limiting access requests from a network by a load balancer according to the invention.

In step S11, the load balancer receives an access request from the network and parses the received access request into a UDP message.

In step S12, the UDP message is transmitted to the aggregator.

Then, the load balancer determines the processing action on the received access request according to the current whitelist and the current blacklist at the load balancer, wherein the blacklist specifies the processing actions on certain access requests.

In step S13, the load balancer makes a judgment whether the access request matches with the whitelist. If so, step S14 is turned to, that is, the access request is passed and sent to a corresponding backend server for further process. Otherwise, the process proceeds to step S15.

In step S15, the load balancer makes a judgment whether the access request matches with the blacklist. If not, step S14 is turned to, that is, the access request is passed and sent to the corresponding backend server for further process. Otherwise, the process proceeds to step S16.

In step S16, the load balancer processes the access request according to the processing action specified by the matched record in the blacklist.

According to the invention, the aggregator receives the UDP message sent by the load balancer, accumulates the received UDP messages according to the predefined combination of data fields and the predefined duration so as to produce a statistical data, and sends the statistical data to the summarizer in response to the request from the summarizer. The statistical data includes the number of the UDP messages containing the predefined combination of data fields accumulated within the current period with a length of the predefined duration.

The summarizer requests the statistical data from the aggregator according to the predefined request time interval, receives the statistical data from the aggregator, generates a blacklist for access requests according to the received statistical data and the predefined rule, and sends the current blacklist at the summarizer to the load balancer according to a request from the load balancer.

As mentioned above, the aggregator may comprise a plurality of aggregation units. The process of performing the accumulation by each aggregation unit to produce the statistical data is described in detail below.

The aggregation unit produces the statistical data with respect to a combination of specific data fields according to the UDP messages received from the load balancer.

According to an embodiment of the invention, the aggregation unit comprises:

a receiving component for receiving the UDP message sent by the load balancer, the UDP message being produced by the load balancer parsing the access request from the network;

a calculating component that accumulates the received UDP messages according to the predefined combination of data fields and the predefined duration so as to produce a statistical data; and a transmission component that sends the current statistical data to the summarizer according to a request from the summarizer.

For each HTTP request from the network, it can be only parsed by the load balancer 101 into a UDP message and transmitted to one aggregation unit in a cluster of the aggregation units of the aggregator 102. Each aggregation unit accumulates the numbers of the access requests according to the predefined condition, for example, according to the combination of specific data fields such as the user identification (userid), the IP address, and the universal resource identifier (uri) (that is, the combination of the specific values contained in these specific data fields) in the UDP message, and the specified duration.

For the received UDP message, the aggregation unit extracts the data fields such as userid, ip and uri from the UDP message, a specified combinations of these data fields (there may be a plurality of combinations) is used as a combination of data fields for accumulation, and the numbers of the requests are accumulated according to the predefined duration (which may include a short period and a long period).

The combination of data fields may be one or more of the following:
userid+ip+uri;
userid+uri;
ip+uri.

Certainly, the combination of data fields may also be a combination including other data fields.

After the completion of the accumulation, the aggregation unit generates a statistical data, for example, in the form of a web page in a JSONS data format. When the request from the summarizer 103 is received, the aggregation unit transmits the statistical data to the summarizer 103.

The detailed process of calculating traffic statistics by one aggregation unit is as follows:

after an accumulating process is started, when the first UDP message with a combination of given data fields is received, a corresponding variations is initialized, the current time when "the first UDP message" is received is used as a valid calculation start time, the number of the accesses requests (total_count) is set to 1, the start time (start_time) is set to the current time, and the length of time lasting (lasting_length) is set to 0:

```
total_count = 1;
start_time = time (NULL);
lasting_length = 0.
```

In the subsequent accumulation calculation, lasting_length is the length of time lasting from the calculation start time (start_time) to the current time (current_time).

For each of the subsequently received messages with the combination of data fields, there are three cases with respect to counting for the access requests according to a relationship between a reception time of the message and the predefined duration:

(1) when the reception time of the message falls within a first predefined period from the start_time (valid calculation start time), the number of the access requests (total_count) is gradually increased by 1, the length of time lasting is a difference between the current time and the start_time (assuming that the predefined duration is set to 60 seconds, then one hour is divided into 60 periods with the predefined duration, and "a first predefined period" accordingly refers to a first period of 60 seconds from the valid calculation start time);

(2) when the reception time of the message falls within a second predefined period immediately after the first predefined period, the start_time (valid calculation start time) will be updated, wherein the reception time of the message is used as an end of a new period with a length being equal to the predefined duration, and the start time of the new period (i.e., a time obtained by subtracting the predefined duration from the reception time of the message) is marked as the valid calculation start time; then the parameter total_count (i.e., the number of the access requests) is updated by firstly calculating the QPS for the first period, multiplying the QPS by a duration of the new period overlapping the first period, and then incrementing the result by 1; and the length of time lasting is updated to the predefined duration; and (3) when the reception time of the message falls within a period after the second period, the current reception time is set to the valid calculation start time, the number of the access requests is reset to 1, the length of time lasting is 0, that is, such case is regarded as an initialization, and then, the traffic will be recalculated.

By taking the predefined duration of 60 seconds as an example, corresponding algorithm pseudo codes are as follows:

```
diff = current_time – start_time;
if (diff < 60 * X) { # when the reception time falls within the first period
total_count ++; lasting_length = diff;
} else if (diff > 2 * 60 * X) { # when the reception time falls with a
period after the second period of time
total_count = 1;
start_time = current_time;
lasting_length = 0;
} else { # when the receiving time falls within the second period of time
start_time = current_time – 60 * x;
total_count = total_count-total_count/60/X * (diff – 60 * X) + 1;
lasting_length = 60 * X;
}
```

The predefined duration can be set to both of the short period and the long period. The predefined duration is set to the short period of time in order to prevent fast DOS attacks, that is, a large number of connection requests attack a server within a short time, so that all available resources are exhausted, and finally a computer cannot process requests from authenticated users any longer. And the predefined duration is set to the long period in order to prevent slow DOS attacks.

The summarization processing of the summarizer 103 and the generation of the blacklist are described in detail below.

The summarizer 103 reads the statistical data relating to the number of the requests from all the aggregation units according to the specific classification, summarizes the statistical data, generates a blacklist according to a predefined policy, and asynchronously loads the blacklist to the load balancer 101.

The construction and specific working principle of the summarizer 103 are as shown in FIG. 3.

The summarizer 103 comprises a receiving component 1031, a generating component 1032, a listening component 1033, a configuration file 1036, and a database 1037.

According to an embodiment of the invention, the receiving component 1031 can create a receiving thread for each aggregation unit, and the receiving thread reads the statistical data for the numbers of the requests with respect to different combinations of data fields from a Web page output by each aggregation unit every a period (e.g., one minute). The statistical data are, for example, data in a JSONSG format.

The generating component 1032 of the summarizer 103 summarizes the statistical data received from the respective aggregation units according to predefined combinations of data fields.

These predefined combinations of data fields may be userid+ip+uri, ip+uri, userid+uri and the like.

The numbers of the requests with respect to the different combinations of data fields will be stored in corresponding hashmaps, respectively. Hashmap is an implementation of a Map interface based on a hash table, and is used for functions of storage, search and the like in computer programming.

When the number of the requests with a certain combination of data fields exceeds a blacklist threshold value relating to the combination of data fields predefined in the configuration file, for example 0.5 QPS (query per second), userid or ip is added to the blacklist so as to produce the current blacklist.

According to an embodiment, the summarized data in the hashmap is stored into the database 1037 by a storing thread in the generating component 1032. According to an embodiment of the invention, a mechanism of double-hashmap is used in order not to lock the shared hashmap between the storing thread and the receiving thread.

In addition, a monitoring terminal 200 of the system can directly acquire the data from the database 1037 through HTTP protocol, that is, the data can be directly exported out in the JSONS format without through the summarizer 103.

The listening component 1033 of the summarizer 103 is used to provide the blacklist to the load balancer 101. When the load balancer 101 initiates the request, the listening component 1033 acquires the current blacklist, and sends the current blacklist to the load balancer 101 along with the whitelist.

According to an embodiment of the invention, the summarizer 103 may work in a mode in which two servers work together, wherein the master server may act as a normal operating machine, while the slave server may act as a data backup machine. When a fault occurs for the master server, the salve server can automatically take over all of the tasks of the master server, thereby a high reliability of the system is ensured.

Although the invention is described by taking the figures and specific embodiments into consideration, the figures and the embodiments in the Description are only examples of the invention, and are not used for limiting the invention. The scope of the invention is defined by the Claims.

The invention claimed is:

1. A method for limiting access requests, the method comprising:
    a load balancer receiving each access request from a network, parsing the received access request into a UDP message, and transmitting the UDP message to the aggregator; and
    the load balancer determining a processing action on the received access request according to a current blacklist, wherein the blacklist specifies the processing action to be made on each of one or more specific access requests,
    wherein
    the aggregator receiving the UDP message sent by the load balancer, accumulating the received plurality of UDP messages according to a predefined combination of data fields and a predefined duration so as to produce a statistical data, and sending the accumulated statistical data to a summarizer in response to a request from the summarizer; and
    the summarizer requesting the statistical data from the aggregator according to a predefined request time interval, receiving the statistical data from the aggregator, generating a blacklist for the access requests according to the received statistical data and a predefined rule, and sending the blacklist to the load balancer in response to a request from the load balancer.

2. The method according to claim 1, the statistical data includes the number of the UDP messages containing the predefined combination of data fields accumulated within the predefined duration.

3. The method according to claim 1, wherein
    the aggregator comprises a plurality of aggregation units operating independently of each other,
    the load balancer transmits each UDP message to one of the plurality of aggregation units, and
    each of the plurality of aggregation units performs the accumulation, respectively,
    the summarizer receives the statistical data from the plurality of aggregation units, respectively, and produces the summarized statistical data, and
    the blacklist is generated based on the summarized statistical data and the predefined rule.

4. The method according to claim 1, wherein
    the load balancer further comprises a predefined whitelist that includes one or more records relating to the access request to be passed, and
    the load balancer determines for each of the received access requests the processing action on the access request as follows:
        when the access request matches with one of the records in the whitelist or does not match with any one of the records in the blacklist, the access request is passed, and
        when the access request does not match with any one of the records in the whitelist and matches with one of the records in the blacklist, the access request is processed according to the processing action specified by the matched record in the blacklist.

5. The method according to claim 4, wherein the predefined whitelist in the load balancer is obtained from the summarizer along with the blacklist.

6. The method according to claim 1, wherein the processing action specified in the blacklist includes one of the following: an interception, a redirection and a delay.

* * * * *